US010757876B2

(12) United States Patent
Visser et al.

(10) Patent No.: US 10,757,876 B2
(45) Date of Patent: Sep. 1, 2020

(54) CULTIVATION SYSTEM FOR CULTIVATION ON WATER IN A BASIN AND FLOATING CARRIERS THEREFOR

(71) Applicant: VISCON B.V., 's-Gravendeel (NL)

(72) Inventors: Anthony Visser, 's-Gravendeel (NL); Simon Joost Kleinjan, Zuid Beijerland (NL)

(73) Assignee: VISCON B.V., 's-Gravendeel (NL)

( * ) Notice: Subject to any disclaimer, the term of this patent is extended or adjusted under 35 U.S.C. 154(b) by 0 days.

(21) Appl. No.: 16/191,198

(22) Filed: Nov. 14, 2018

(65) Prior Publication Data

US 2019/0075742 A1 Mar. 14, 2019

Related U.S. Application Data

(63) Continuation of application No. 14/902,429, filed as application No. PCT/NL2014/050328 on May 22, 2014, now Pat. No. 10,159,204.

(30) Foreign Application Priority Data

Jul. 4, 2013 (NL) ...................................... 2011089

(51) Int. Cl.
*A01G 31/04* (2006.01)
*A01G 24/00* (2018.01)
*A01G 7/04* (2006.01)

(52) U.S. Cl.
CPC ............ *A01G 31/042* (2013.01); *A01G 7/045* (2013.01); *A01G 24/00* (2018.02); *Y02P 60/216* (2015.11)

(58) Field of Classification Search
CPC ....... A01G 31/042; A01G 31/04; A01G 31/02
See application file for complete search history.

(56) References Cited

U.S. PATENT DOCUMENTS

| 5,261,185 | A | * | 11/1993 | Koide | .................... | A01G 31/02 47/63 |
| 7,448,163 | B2 | * | 11/2008 | Beeman | .................... | A01G 9/00 47/60 |
| 8,889,006 | B2 | * | 11/2014 | Lassovsky | .............. | C02F 3/327 210/150 |
| 9,807,950 | B2 | * | 11/2017 | Day | ........................ | A01G 31/02 |
| 2003/0070357 | A1 | * | 4/2003 | Huang | ..................... | A01G 9/00 47/66.3 |
| 2004/0255513 | A1 | * | 12/2004 | Becker | ..................... | A01G 9/00 47/65.9 |

\* cited by examiner

*Primary Examiner* — Kristen C Hayes
(74) *Attorney, Agent, or Firm* — Brandon V. Zuniga; James R. Gourley; Carstens & Cahoon, LLP

(57) ABSTRACT

A carrier for growing crops, such as lettuce, is disclosed. The carrier floats on water in a pond, and includes at least one floating beam and a carrier connectable to the floating beam, and a number of growth locations for the crops where holders for the crops or roots of the crops extend into the water.

10 Claims, 9 Drawing Sheets

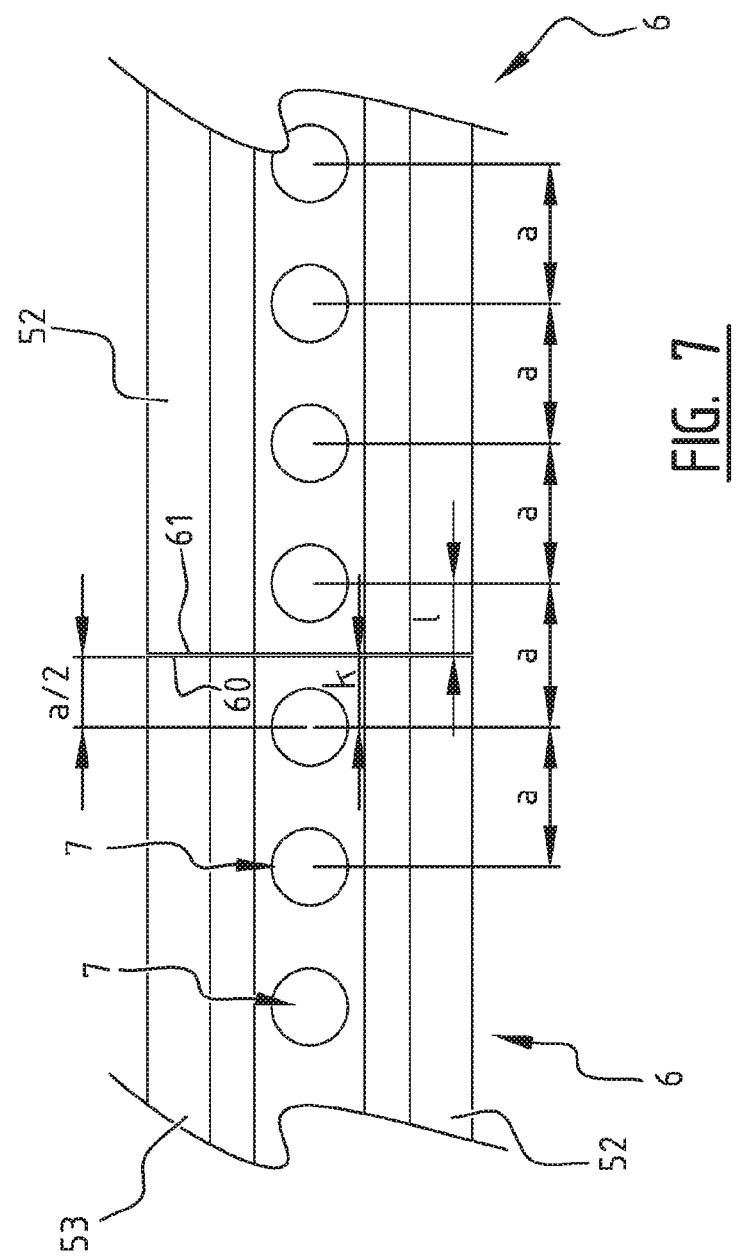

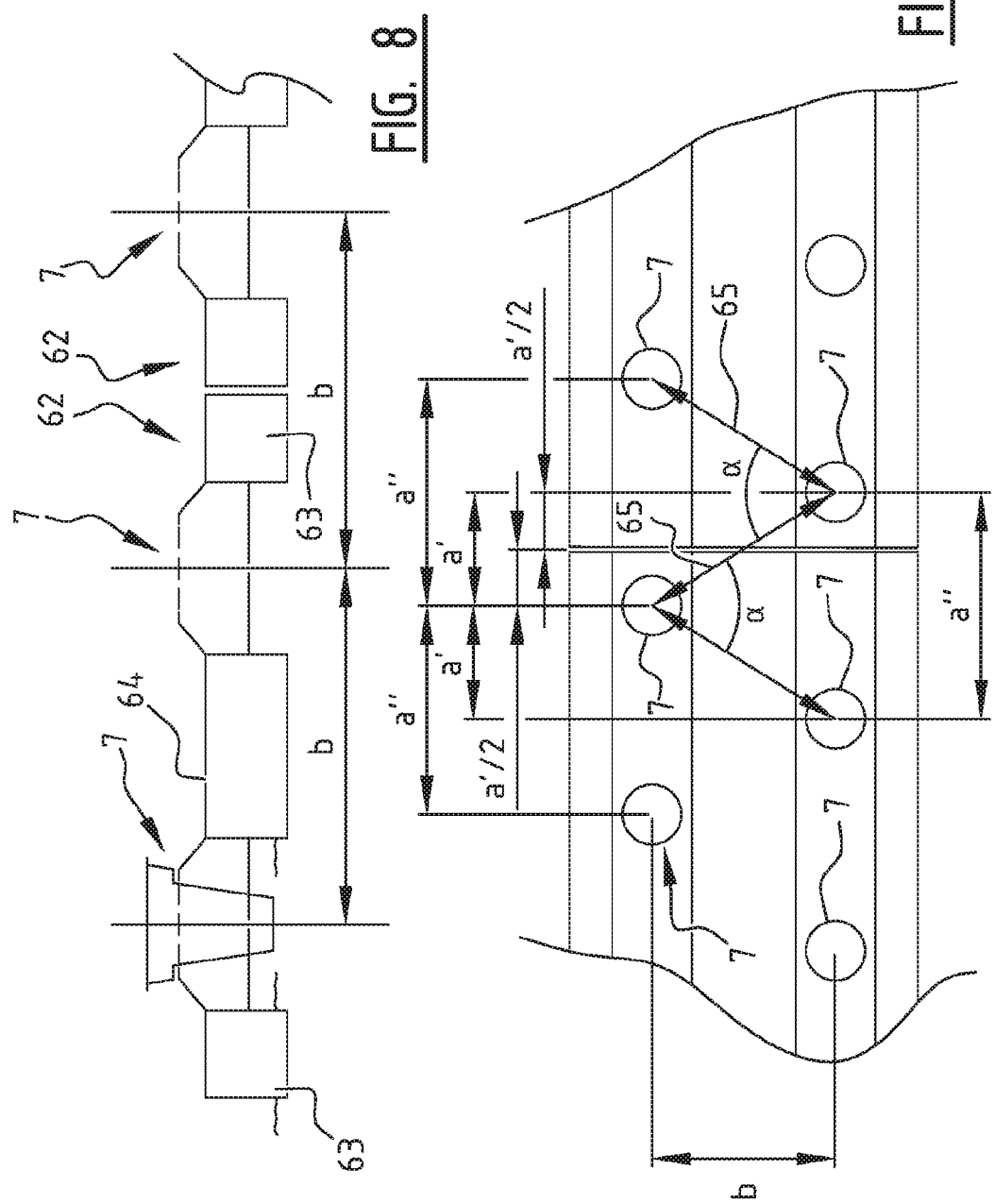

CULTIVATION SYSTEM FOR CULTIVATION ON WATER IN A BASIN AND FLOATING CARRIERS THEREFOR

This application is a continuation application of co-pending U.S. patent application Ser. No. 14/902,429 entitled "Cultivation System for Cultivation on Water in a Basin and Floating Carriers" filed Dec. 31, 2015, which is a 371 national stage application of PCT Patent Application No. PCT/NL2014/050328 entitled "Cultivation System for Cultivation on Water in a Basin and Floating Carriers Therefor" filed on May 22, 2014, which claims priority to Dutch Patent Application No. 2011089 filed on Jul. 4, 2013, the entire contents of which are incorporated herein by reference.

The present invention relates to a carrier for use in a cultivation system for cultivating crops on water in a basin.

It is generally known to make use here of floating carriers in the basin which have a rectangular form and have growth locations therein which form passages for providing roots of the crops with access to water in the basin. Such floating carriers are for instance known from WO-2010/093248, and such floating carriers more particularly take a form generally similar to a tray, i.e. approximately square and only a little rectangular, and in any event not elongate. Side walls extending downward during use enclose an air layer in order to impart buoyancy to these known tray-like floating carriers. The known tray-like floating carriers are for instance moulded or pressed from a thin layer of plastic and are soft and pliable, which may perhaps suffice for the buoyancy of the floating carriers. It is the object here to provide simple and inexpensive floating carriers with the desired buoyancy and the ability to (manually) handle such floating carriers to a desired extent, and it is precisely here that there is a problem.

The objective, particularly in the case of crops such as lettuce, is bulk production and, in combination therewith, a far-reaching degree of automation. Scaling up the size of the known floating carriers does not provide a solution here.

The present invention therefore has for its object to provide embodiments of carriers for cultivating determined crops on water in a basin or a pond which is suitable for far-reaching automation and bulk production. Provided for this purpose according to the present invention is a carrier with the features defined in the appended independent claim.

According to the present invention an embodiment which is automated to far-reaching extent is made possible for the purpose of cultivating determined crops, such as lettuce, on water in a basin or pond. The floating carriers are sufficiently sturdy and strong for this purpose even when very long floating carriers are applied, which allows mechanical processing such as lifting out of the basin, using a lift, floating carriers having therein at least approximately fully-grown crops and the associated weight in addition to the weight of the floating carriers themselves. Such strengthened floating carriers are also suitable for engagement by even a pivot mechanism. The specific configuration of the cultivation system with, among other parts, the pivot mechanism particularly provides for minimization of the space required for the cultivation system.

The broadest framework for the scope of protection for the present invention is outlined with reference to the appended independent claim. Many preferred embodiments are possible within this framework and these are defined in the dependent claims, to which reference is made here.

It is important here in this respect to point to the features of the floating carriers which enable mechanical processing other than and/or in addition to transport or displacement. Particular reference is made here to processes oriented toward growth locations, such as the planting of young crops, the cultivation of at least approximately fully-grown crops and so on. A cultivation system with floating carriers, and each of the floating carriers per se, is designed for this purpose such that mutual distances between growth locations are precisely predefined, also at transitions between successive floating carriers.

Following the foregoing general specifications of the present invention, inter alia with reference to the appended claims, there follows hereinbelow the more detailed description of specific embodiments, which are shown only by way of illustration and will be described below without limitative effect on the scope of protection according to the claims. In the drawing:

FIG. 4, FIG. 5 and FIG. 7 shows respectively a perspective view of a cross-section through, a front view and a top view of a floating carrier in a first embodiment according to the present invention;

FIG. 8 and FIG. 9 show respectively a front view and a top view of a second embodiment of a floating carrier according to the present invention;

Figure 1:
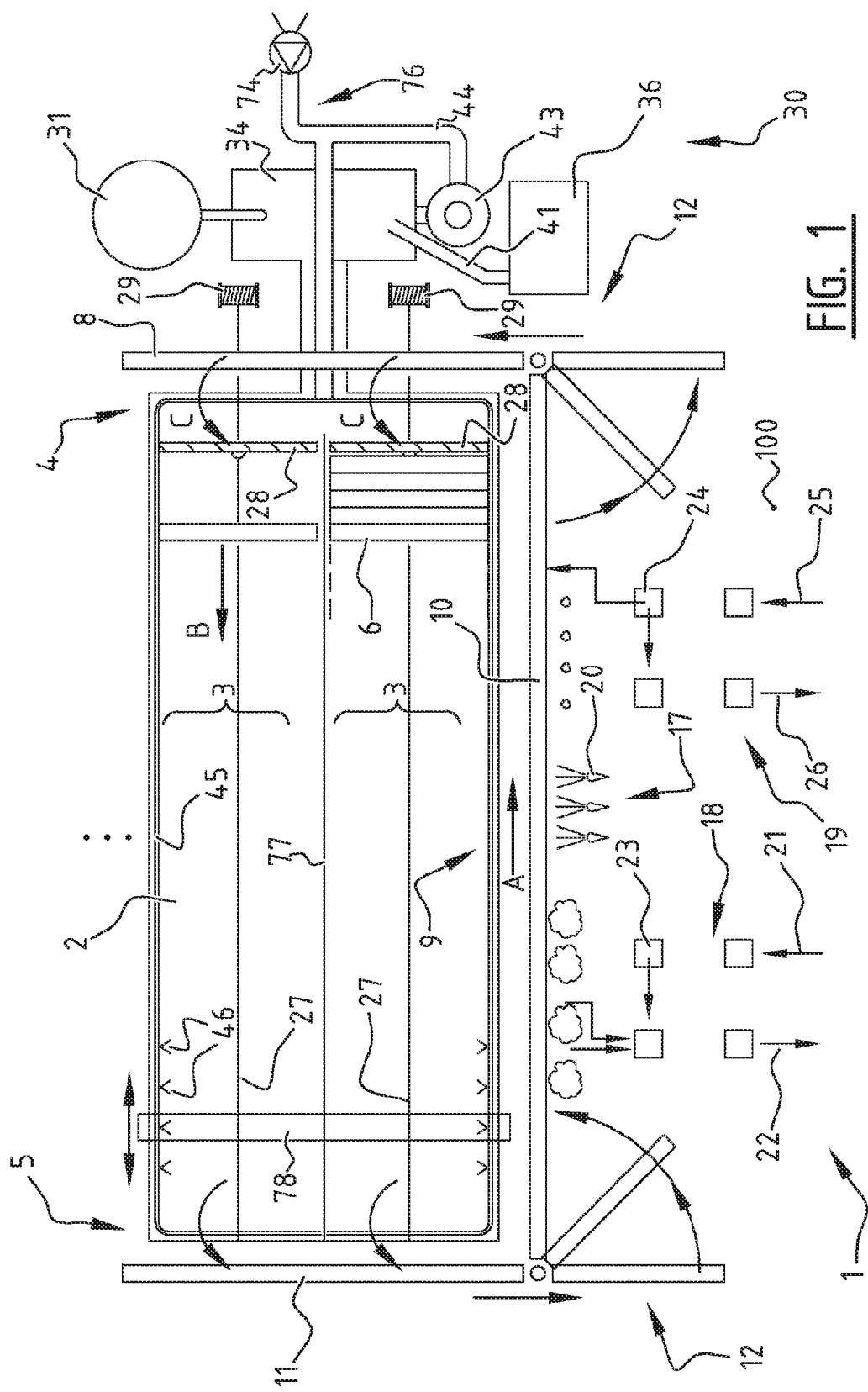
FIG. 1, FIG. 2 and FIG. 3 show respectively a top view, a perspective view of a detail and a perspective view of another detail of a cultivation system according to the present invention.

FIG. 1 shows a cultivation system 1 for crops for bringing the crops, such as lettuce, to full growth in floating carriers on water. Cultivation system 1 comprises a basin 2 with water therein. Basin 2 comprises two elongate production ponds 3. Shown on the right-hand side in FIG. 1 is an infeed end 4 on a short side of the elongate production ponds 3 and the basin 2 assembled therefrom. An outfeed end 5 is located opposite infeed end 4.

Floating in each of the production ponds 3 are large numbers of elongate floating carriers 6, only several of which are shown in FIG. 1. The length of floating carriers 6 corresponds to the width of the elongate production ponds 3 and floating carriers 6 float or are moved forward in an orientation transversely of a longitudinal direction of the elongate production ponds 3. Floating carriers 6 are displaced through an associated one of the two production ponds 3 from infeed end 4 to outfeed end 5 at a rate corresponding to development of the plants to full growth. The length of production ponds 3 is for instance adapted to this purpose.

Figure 3:
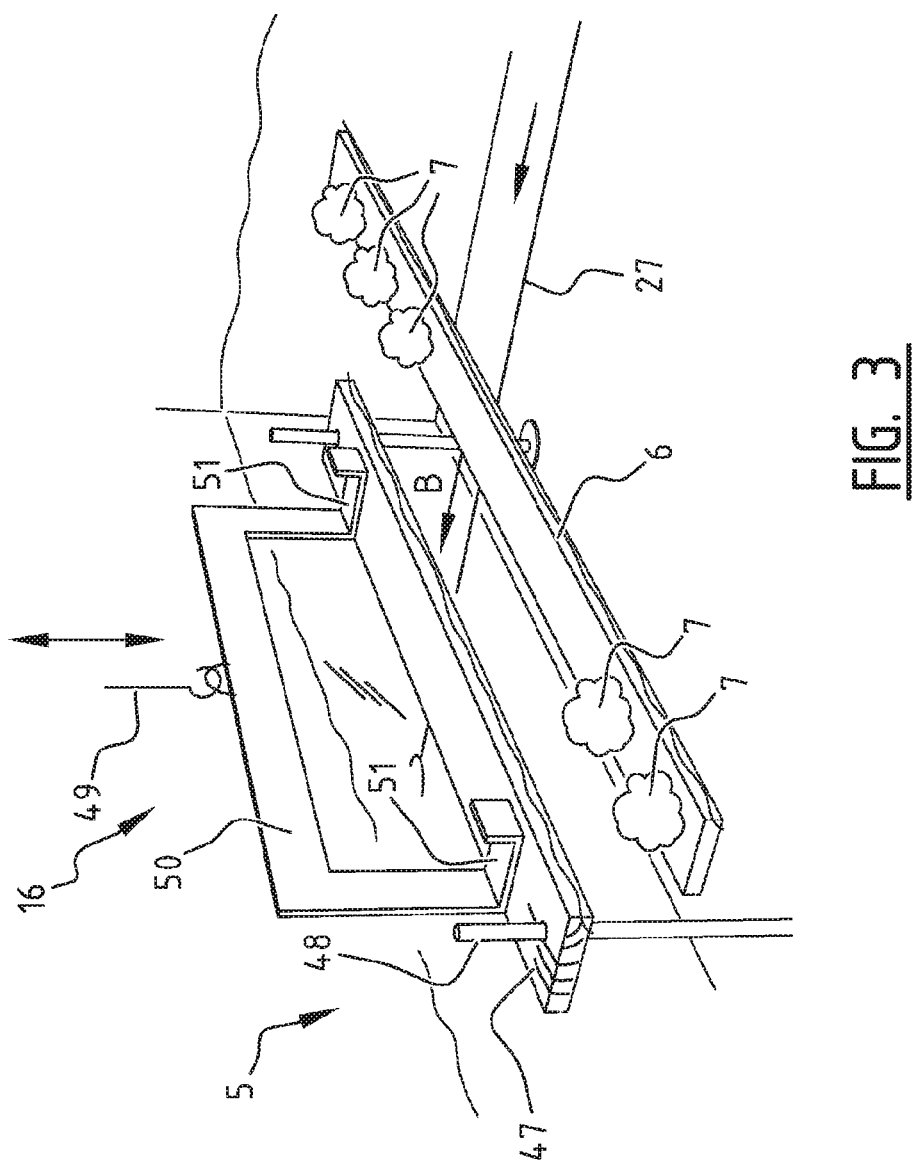
Figure 5:
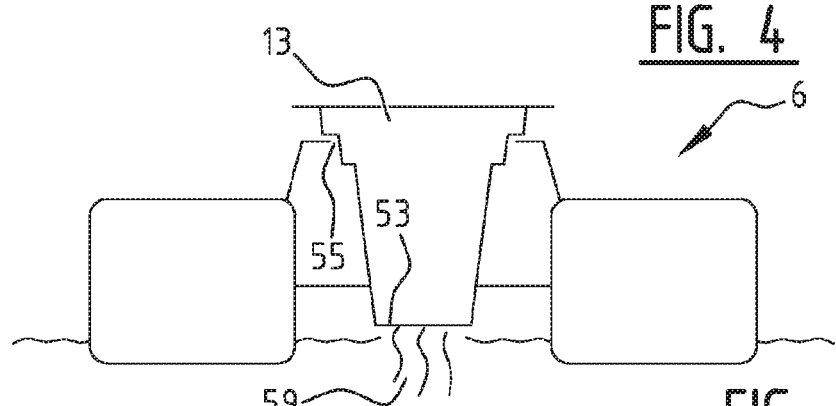

As shown for instance with reference to a schematically represented floating carrier 6 in FIG. 3, floating carriers 6 each comprise a number of growth locations 7 for the crops. In growth locations 7 holders 13 for the crops or roots of the crops extend into the water as shown in FIG. 5, wherein holders 13 are shown in more detail in FIG. 6, wherein shoulders 14 of holders 13 can rest on teeth 15 of a fork for manipulation of holders 13 and the crops therein.

Cultivation system 1 in FIG. 1 further comprises a transport system. This transport system comprises a lifting mechanism 16 (see FIG. 3) at outfeed end 5 and a lowering mechanism designated schematically with arrows in FIG. 1 at infeed end 4. Such a lowering mechanism can have an embodiment similar to that of lift 16 at outfeed end 5 as shown in FIG. 3.

The transport system further comprises a conveyor 8 along infeed end 4 between the lowering mechanism and a long side 9 of the elongate production ponds 3. A conveyor 11 is also arranged along outfeed end 5 between the lifting mechanism and the long side 9 of the elongate production ponds 3. At least one conveyor 10 is further arranged along the long side 9 of the elongate production ponds 3.

The transport system of the cultivation system further comprises according to the present invention two pivot mechanisms 12. A first pivot mechanism is arranged between conveyor 8 along infeed end 4 and the at least one conveyor 10 along the long side 9 of the elongate production ponds 3. A second pivot mechanism 12 is arranged between conveyor 11 along outfeed end 5 and the at least one conveyor 10 along the long side 9 of the elongate production ponds 3. The amount of space required for cultivation system 1 can be limited by arranging these pivot mechanisms 12. This further makes it possible for floating carriers 6, which have been taken out of the water in basin 2 at the outfeed end 5, to be displaced back to infeed end 4 along the shortest possible path via the at least one conveyor 10. It is noted here that with the arrangement of pivot mechanisms 12 as shown in FIG. 1 each of the floating carriers 6 is placed with the lowering mechanism into the water of basin 2 at the infeed end in the same orientation as the orientation of floating carriers 6 when they are lifted out of the water with lift 16 at outfeed end 5. Particularly in respect of throughput of the floating carriers in a constant orientation as described below with reference to FIGS. 7-9, such a constant orientation of the floating carriers during throughput and optional processing or handling outside basin 2 can be highly favourable and relevant.

In an alternative embodiment (not shown) it is possible for pivot mechanisms 12 to be configured and designed to pivot over basin 2.

Figure 11:
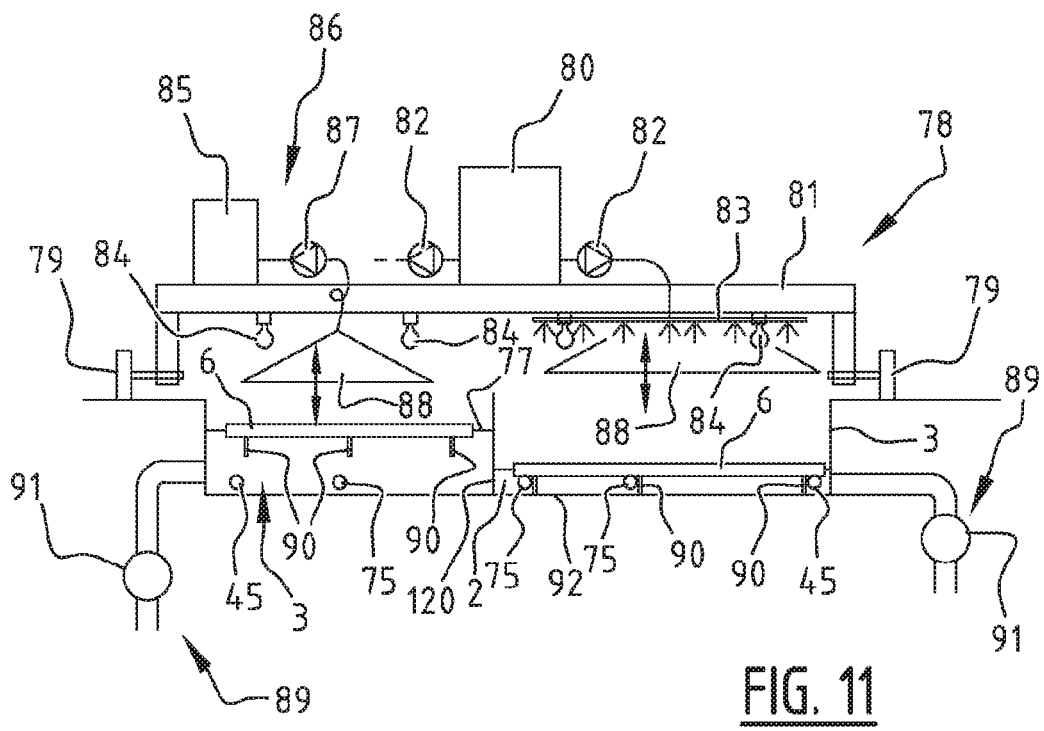
FIG. 11 shows a sectional view of a basin according to the present invention having additional features relating to a bridge over the basin.

In the embodiment shown here basin 2 comprises two production ponds 3, although more production ponds are likewise possible. Production ponds 3 lie parallel to each other. Indicated schematically at the top of FIG. 1 is that more than two production ponds 3 can be provided. The orientation of production ponds 3 remains determinant here in defining orientations in a cultivation system according to the present invention. In fact the basin 2 is divided into two or more ponds 3, possibly only by an imaginary division line 77. For a high efficiency of use, floating carriers in each pond 3 are aligned in parallel and at a short intermediate distance between longitudinal ends thereof at a division line 77. Alternatively for a division line, the basin 2 may comprise more than one pond 3 separated by a barrier, separation or division 120 along line 77 between ponds 3 in basin 2, as indicated in FIG. 11. As a further alternative, a basin 2 may comprise a single pond 3. However, having multiple ponds per basin may contribute to higher capacity (more floating carriers, wider basins 2 comprising multiple ponds 3 for limiting the length of the floating carriers in each pond), more diversity in crops grown in each of the ponds and requiring distinct growth periods, enhanced enclosure of added air or oxygen underneath floating carriers 6 since more surface area of the water body in basin 2 can be covered by more floating carriers, and the like. Also, facilities alongside the basin can be shared between ponds 3 of the basin 2, such as in the case of the below described lift 16, which could be movable along the outfeed end 5.

In the embodiment of FIGS. 1 and 11, a bridge 78 is shown to span over the width of the basin 2. The bridge 78 is displaceable in this embodiment along the length of the basin 2 or ponds 3 and can roll over wheels 79 in the direction of the double arrow arranged at the bridge 78 in FIG. 1. As a consequence, specific processing steps can be performed automatically, such as spraying plants and crops, sucking away lice, and illuminating the plants regularly with ultraviolet light to kill fungi. The bridge 78 may alternatively be stationary or be movable over tracks or the like.

The bridge 78 may comprise a spanning structure 81 to extend over the basin 2.

On spanning structure 81 of bridge 78, a tank 80 may be provided to contain any one or more than one of water, nutrients, detergents, pesticides, herbicides and/or other content. Such contents may be supplied from a side of basin 2, instead of storage in tank 80 on spanning structure 81. Such content can be sprayed, using a pump 82 and spray lines 83, from above onto plants or crops, like lettuce, in or on floating carriers 6 in ponds 3 of basin 2. Spray lines 83 may be arranged to extend to both sides of the spanning structure 81, whereas spray line 83 in FIG. 1 is only shown to extend from the middle to the right side of the spanning structure 81. In this manner crops can be watered or be supplied with nutrients, detergents, pesticides, herbicides and/or other content. In particular watering can be beneficial during early stages of the crops development, in which early development stages, roots of the crops will not (yet) have reached the surface of the water body in basin 3. In particular in embodiments of floating carriers covered with cloth and in particular jute, the feature of spraying the floating carriers may contribute to preventing the roots of younger crops or plants from drying out, simply by wetting the cloth and in particular the jute.

Spanning structure 81 may further, at an underside thereof, comprise UV light sources 84. UV light sources can be employed to kill fungi or mildew, and the context with the basin has not been disclosed previously. These UV light sources can be powered using a battery, for example on the spanning structure 81, or a mains connection. A manner of connecting UV light sources 84 to a mains connection at a side of basin 2, or in any case distant from the bridge 78, is well within reach of any skilled person to resolve. UV light sources 84 can be arranged on a separate bridge (not shown) from the one carrying the spray lines 83 or even the stationary boom (not shown) extending across the basin 2.

Likewise, a suction system 86 can be provided on spanning structure 81, or on an additional bridge (not shown) or suspended from a stationary boom (not shown). However, it is preferred that spraying and/or UV light for killing fungi and/or suction for removing lice can be displaced along the length of the basin 2, so that such processing can be performed on plants or crops, growing on floating carriers 6 in every stage of development of such plants or crops.

The suction system 86 comprises a holding container 85, which is connected to a suction pump 87, which in turn is connected to a suction head 88, which can be lowered to and raised from the floating carriers 6. With the suction head 88 in a lowered position, and the suction pump 87 in operation, lice and dust can be sucked off the plants or crops on the floating carriers 6, and into the holding container 85. Also, for instance lettuce leaves are surprisingly reported to become tougher when regularly subjected to vacuum cleaning and/or rustling the leaves in some other manner. With the suction heads 88 in the raised position, the way is clear for spray lines 83 or UV light sources 84 to be put to good use.

Separate bridges for a distinct functionalities can provide an advantage that operation of the elements and components for specific functionalities can be operated at random, without having to ensure that for instance UV light sources are inoperative, when spray lines are activated, and the like. On the other hand, suction system 86 is not likely to be very effective during operation of the spray lines or shortly thereafter. Consequently, a minimum of one bridge 78 is likely to suffice, and more bridges can be beneficial, although this would result in an increase in costs of the system in its entirety.

Further, it is noted here entirely separate and independent from bridge 78 and from the features thereof, that the at least one floating carrier 6 can comprise stands or feet 90. In the embodiment of FIG. 11, it is shown that the basin comprises an filling or evacuation system 89 to selectively lower or raise a water level in each of the separated ponds 3 of the basin 2. The evacuation system 89 comprises a pump 91 and is connected to the water body in the basin 2. Pomp 91 can be reversed for filling or replenishing the basin 2. When evacuation system 89 has been operated to lower the water level in the basin 2, such as of the right hand pond 3 of the basin 2 in FIG. 11, the objective thereof is to temporarily remove water from the roots, to prevent rot or other harmful effects resulting from prolonged submersion in the water of basin 2, and/or aeration of the roots to promote the development of plants in or on the floating carriers. In a situation of lowered water levels, injury of root systems of plants or crops growing on floating carriers 6 can be prevented in that floating carriers 6 have supports, stands or feet 90 to support floating carriers 6 on the floor 92 of basin 2. Additionally to or alternatively for the feet 90, floating carriers 6 may rest on conduits 45, 75 of the water and/or air and/or oxygen supply system described above, in a lowered water level situation. Consequently, an effective ebb and flood system can be realized in conjunction with floating transport of the floating carriers 6 through the pond(s) 3 of basin 2. Water from basin 2 can be transferred, to achieve a system wherein water may be sequentially evacuated from the ponds or basins. Evacuation system 89 having pump 91 can be embodied such that water from one of the ponds 3 can be pumped away to an arbitrary holding tank, or natural or artificial lake, and/or the like, to achieve essentially the same effect. for independent level control of the ponds 3, this can only function properly if a barrier, separation or division 120 is provided between the ponds 3 along line 77 as indicated above in relation to FIG. 1 and shown in FIG. 11.

Figure 14:
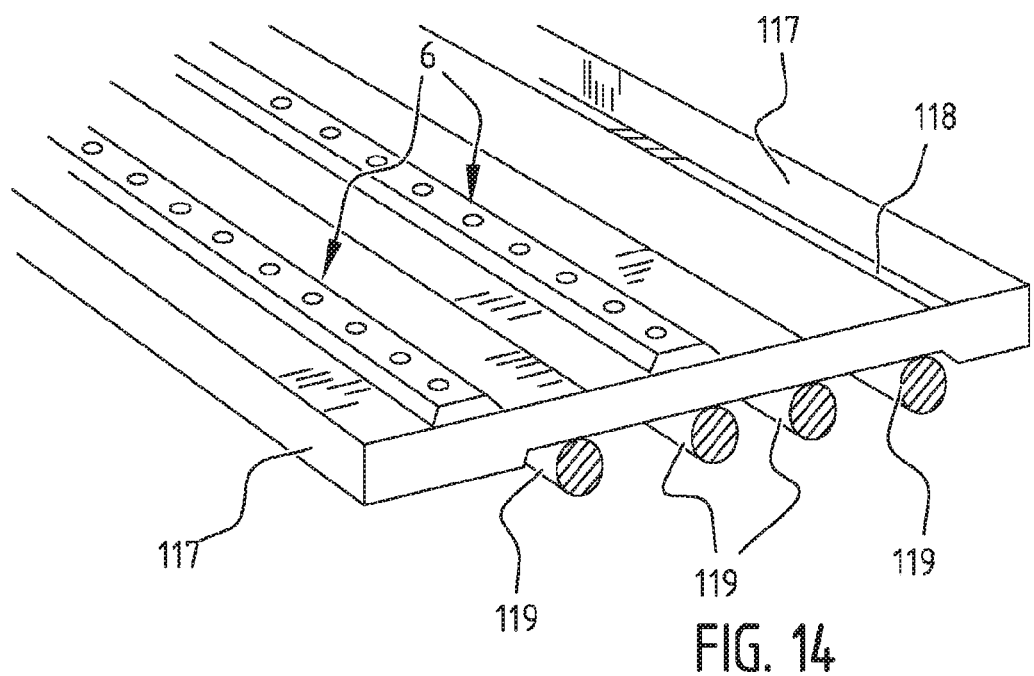
FIG. 14 shows an embodiment of ponds or basins, which are connected or connectable for transfer of water or fluid in general from the one to the other (and/or vice versa).

If the ponds 3 are separated, i.e. remote from each other over a considerable distance, and are contained essentially each in an own basin 2, each pond 3 or basin 2 can have its own water purification installation 30, which will be described below. In such an embodiment, as shown in FIG. 14, connection pipes 108 can be arranged between the distinct ponds 3 and/or more preferably between reservoirs 34 belonging to the ponds 3. Using pumps 109, 110, water can be transferred from one pond 3 to the other pond 3. Non-return valves 111, 112 ensure that a desired flow direction is achieve, together with schematically represented valves 113, 114, 115, and 116. When the ponds are separated, pumps 109, 110 are idle and valves 114 and 115 are closed, as shown in FIG. 14. When water is to be transferred from the left pond 3 to the right pond 3, pump 109 is activated and only valve 114 is open. Valve 113 is closed to prevent circulation of the water from pump 109 back to the originating left pond 3. Additionally or as an alternative for open valve 114, valve 115 can be opened for transfer of water from the left to the right pond in FIG. 14, such that water transferred is inserted into the right pond 3 via the conduits 45. If water is to be transferred in the opposite direction, pump 110 is activated and only valves 113 and 115 are kept open for the transfer to be effected from the right to the left pond via the conduits 45 of the left pond 3.

Additionally or alternatively, a submerging station may be provided along the length of basin 2, where floating carriers 6, 93 may be submerged into the water in basin 2 to wash the crops growing and/or developing in or on the floating carriers 6, 93. The submerging station may be mobile, like the bridge 78 of FIG. 11 and may even be a part of the bridge 78, with for instance extendable pushers (not shown) extending downward from the spanning structure of the bridge 78.

In an embodiment with two or more production ponds 3 a cultivation system can have the feature that at least one of the lifting mechanism at outfeed end 5 and the lowering mechanism at infeed end 4 is displaceable along respectively outfeed end 5 and infeed end 4 of basin 2 in order to place floating carriers 6 in or remove them from basin 2 at a desired location in a relevant one of the two production ponds 3.

Diverse handling or processing stations are disposed along conveyor 10 along the long side 9 of basin 2, i.e. a cleaning station 17, a harvesting station 18 and a planting station 19.

Cleaning station 17 is represented symbolically by spray nozzles 20. With the object of achieving proper cleaning the floating carriers 6 for cleaning are preferably manufactured from a smooth plastic.

At harvesting station 18 containers or trays 23 are supplied in the direction of arrow 21, filled with harvested crops, and filled trays 23 are subsequently discharged in the direction of arrow 22.

At planting station 19 containers 24 filled with seeds or young plants are supplied in the direction of arrow 25, after which the seeds/young plants/crops are transferred to growth locations 7 in floating carriers 6, as for instance shown schematically in FIG. 5, with floating carrier 6 in a floating state in FIG. 5. Emptied containers 24 are then discharged in the direction of arrow 26.

In a potential embodiment, in particular of interest in case of supply of seeds, floating carriers 6 can be placed temporarily in a growth cell (not shown, but roughly positioned at location 100 in the schematic representation of FIG. 1) for example for germination of the seeds. To this end, floating carriers 6 may need to be taken out of the circulatory system shown in FIG. 1. To this end a robot type of transporter (not shown) may be employed to grab a floating carrier 6 before or after seeds are planted thereon or therein, after which the floating carriers 6 can be placed in the growth cell. Once the seeds have germinated and some roots have developed, the floating carriers 6 may be taken from the growth cell and be inserted back into the circulatory system at transporter 8 or 10 to be entered into the basin 2, in the same manner as when young plants/crops are supplied and put into the plant positions of the floating carriers 6.

A floating carrier 6 moving over conveyor 10 in the direction of arrow A is lifted out of the water of basin 2 using lift 16, transported by conveyor 11 and pivot mechanism 12 to conveyor 10, along which harvesting takes place at harvesting station 18, floating carriers 6 are cleaned at cleaning station 17 and new young plants are placed in floating carriers 6 in the manner shown in FIG. 5, in particular into holders 13, and transported via the additional pivoting station to infeed end 4 using a lowering mechanism to lower the floating carriers into the water of basin 2.

Cultivation system 1 comprises an advancing mechanism for displacing floating carriers 6 through production ponds 3. The advancing mechanism comprises a tractive device embodied as elastic cable 27, the cable 27 extending from outfeed end 5 to a cross beam 28 in production pond 3. Cable 27 exerts a force in the direction of arrow B on cross beam 28 so that floating carriers 6 floating in the direction of arrow B in front of cross beam 20 are pulled to outfeed end 5. The advancing mechanism further comprises a retractive device located opposite cable 27 relative to cross beam 28 and here in the embodiment of a selectively actuable winch 29 connected to cross beam 28. Using winch 29 in an actuated state thereof the cross beam 28 can be pulled back to infeed end 4 in order to create space between a series of floating carriers 6 floating in production pond 3 and the cross beam 28 pressing on these floating carriers 6, so that a lowering mechanism, not shown in more detail, is able (arrows C) to place a new floating carrier 6, just filled with young plants, between the already floating floating carrier 6 and cross beam 28.

From infeed end 4 the floating carriers 6 are moved forward with this advancing mechanism to outfeed end 5 at a rate corresponding to development of the crops to full growth.

Figure 2:
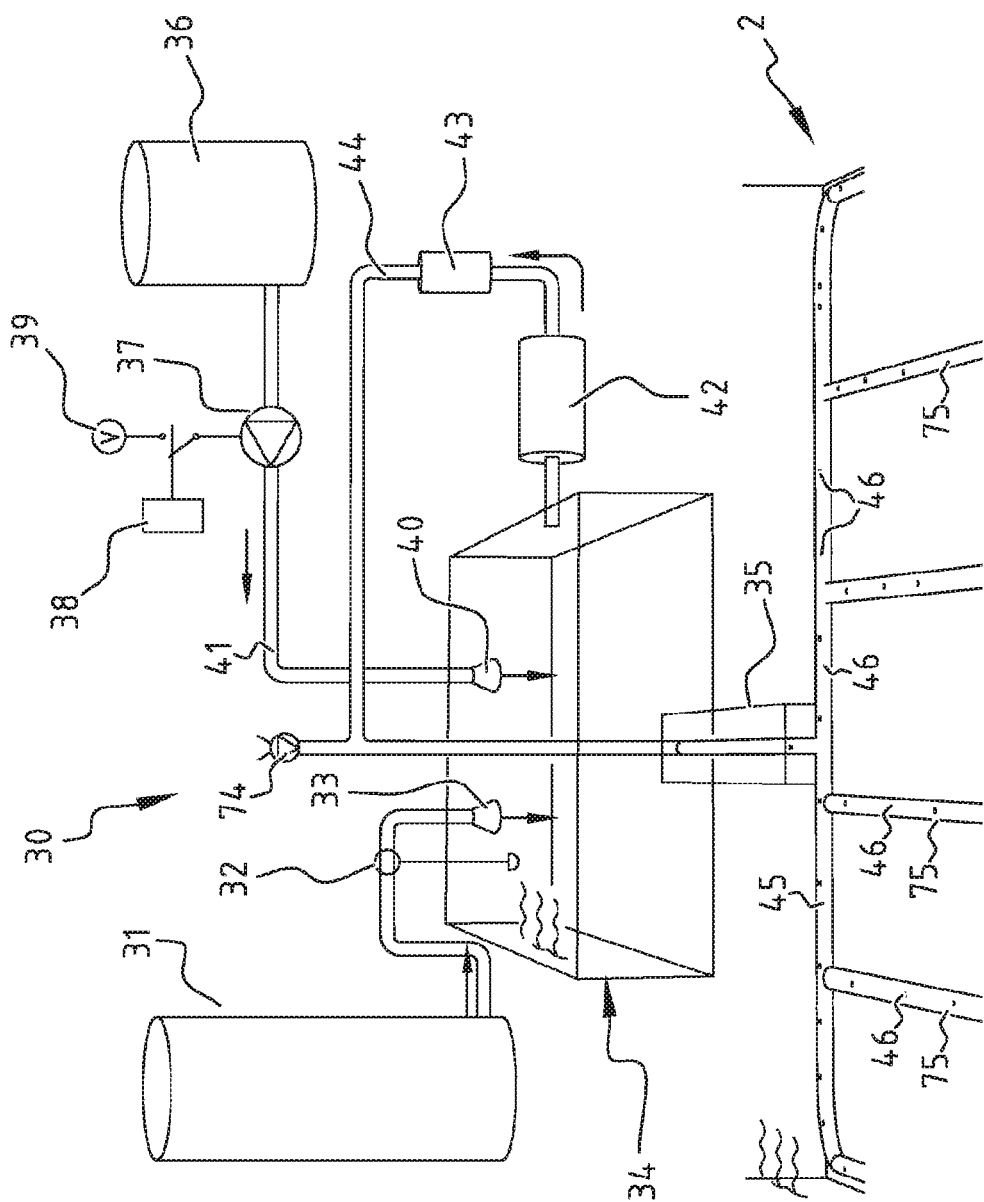

The cultivation system further comprises a water purification installation 30 as shown in more detail in FIG. 2. Water purification installation 30 also fulfils a function for supplementing water in the basin when this is deemed necessary in order to form a water supply installation. Provided for this purpose is a water tank 31 which can add water to a reservoir 34 via a float configuration 32 and a discharge 33 when the level in reservoir 34 falls below a level to be determined with float configuration 32. Reservoir 34 is in open connection with basin 2 via a channel 35 so that replenishment of water from tank 31 into reservoir 34 is caused immediately in the case of a low level of water in basin 2. Water purification installation 30 can also comprise a container 36 for nutrients, pesticides, herbicides and the like. A conduit 41 runs from container 36 to a discharge 40 at reservoir 34 via a pump 37, for instance a selectively controllable electric pump which is selectively connectable to a voltage source 39 using a control 38. Fresh water from tank 31, substances from container 36 and a quantity of water from basin 2 are thus mixed in reservoir 34. This mixture is suctioned out of the reservoir via a pump 42 and fed to a cleaning system 43, for instance a cleaning system based on ultraviolet light. A conduit 44 runs from cleaning system 43 through reservoir 34 and channel 35 between basin 2 and the reservoir 34 to a circulation conduit 45. Circulation conduit 45 comprises outflow openings 46 at mutual distances in order to realize a uniform distribution over basin 2 of fresh water added from tank 31, substances from container 36 and cleaned recycled water from basin 2.

Circulation conduit 45 is arranged in and at least partially around basin 2, wherein it is noted that the circulation conduit can alternatively comprise a random number of linearly extending pipes extending in the longitudinal direction of production ponds 3, such as the conduits 75 in the embodiment of FIG. 2, which also comprise outflow openings 46 therein for as uniform distribution as possible of fresh or recycled water and/or substances.

Further, the cultivation system may comprise an air supply installation 76, comprising an air pump 74, connected in the shown embodiment to conduit 44 on the one hand and extracting air from its surroundings on the other hand. More preferably, air pump 74 is connected to an oxygen supply. Thereby air or oxygen may be injected into the water body in basin 2 underneath the floating carriers 6. Since the elongate floating carriers 6 are arranged or oriented in a side-by-side configuration, as they are moved through basin 2, the floating carriers 6 effectively cover much if not most if not all of a surface area of the water body in basin 2. Air injected into the water body in basin 2 through openings 46 in conduits 45 or 75 will tend to rise to this surface area of the water body. Most of this air or oxygen will be captured underneath the floating carriers 6, in stead of dissipating into the air above the ponds 3. The air or oxygen, that is trapped underneath the floating carriers 6 in this manner will beneficially influence root growth of plants developing in the floating carriers 6. For the supply of air or oxygen, the same conduits 45, 75 may be used as for supply of fresh or recycled water and/or substances, but additionally or alternatively, separate conduits may be employed for liquids and for gasses, in particular for water and/or substances on the one hand and for air and/or oxygen on the other hand. For instance, the conduits 75 may be exclusively connected to the air supply installation 76, which may supply air in general or mainly oxygen, and circulation conduit 45 may be dedicated to supply of fresh and/or recycled water and/or substances.

Lifting mechanism 16, which is schematically represented in FIG. 1 and shown in more detail in FIG. 3, comprises a float 47 displaceable up and downward in the water in basin 2 along at least one guide 48. In a situation where it floats on the water the float 47 forms a stop for floating carriers 6 in production ponds 3. Particularly when elastic cable 27 exerts a pulling force in the direction of arrow B on floating carriers 6 lying side by side, space must be created to take a floating carrier 6 lying closest to outfeed end 5 out of the water using lift 16. Provided for this purpose is a crane 49 which is movable up and downward in the direction of double arrow D and which is represented schematically with a hook thereof. Frame 50 with teeth or carriers 51 thereon is suspended from hook 49. When hook 49 of the crane is lowered, the weight of the crane and the frame 50 resting on the float will press on float 47 and press float 47 downward, wherein float 47 can move in downward direction over guides 48 in the form of simple rods 48. When the float forming a stop for floating carriers 6 is pressed away downward and the teeth or carriers 51 have been immersed to a desired depth in the water while elastic cable 27 pushes floating carriers 6 toward outfeed end 5, a floating carrier 6 lying closest to outfeed end 5 will be positioned directly above the teeth or carriers 51 of frame 50, and immediately thereafter the hook 49 of the crane can be pulled upward in the upward component of the direction indicated with double arrow D. Depending on the dimensioning of the carriers or teeth 51, a single floating carrier 6 at a time can be lifted out of the water or more than one of the floating carriers 6 can be lifted simultaneously out of the water.

Thus implemented is the feature enabling an underside of at least one of the floating carriers 6 to be engaged by crane 49 at outfeed end 5 for the purpose of lifting the carrier out of the water of basin 2.

Figure 4:
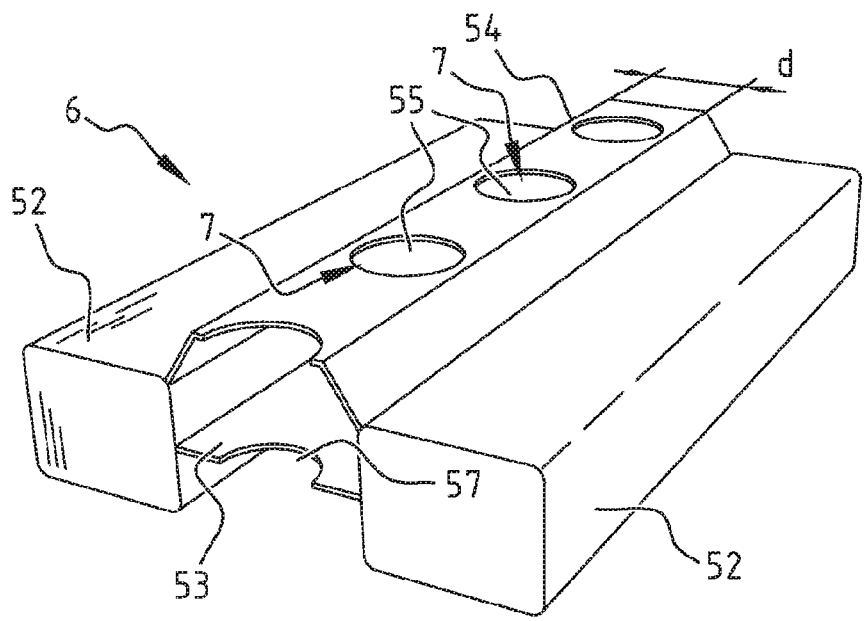

FIG. 4 shows a possible embodiment of one of the floating carriers 6. Floating carrier 6 comprises two continuous beams 52 which are hollow but could alternatively be manufactured from material which is solid or in any case buoyant. Beams 52 extend as strengthening beams over substantially the whole length of the elongate floating carrier 6. A sufficiently stiff, robust and strong construction of floating carriers 6 can thus be provided, also in combination with connecting plates 53 which extend between beams 52. On the basis of the thus realized stiffness and strength of floating carriers 6 equipped with beams 52 intensive manipulation of floating carriers 6 is possible even with very simple lifting systems, such as lift 16 in FIG. 3. It is precisely as a result of the profiles of beams 52 being closed all the way round the cross-section that the desired degree of stiffness and strength is achieved.

Figure 6:
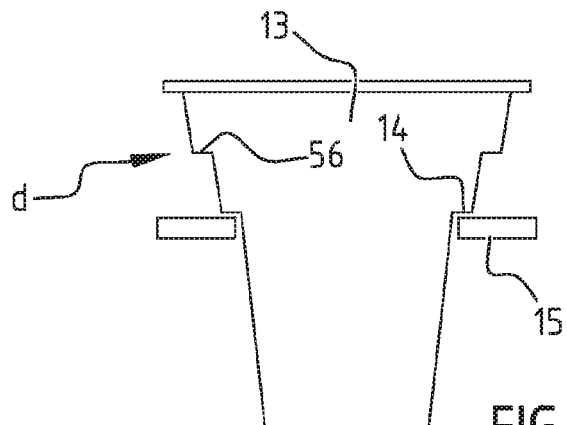
FIG. 6 shows a plant pot for use together with floating carriers according to the present invention.

Backing elements 54 are arranged between beams 52 in addition to connecting plates 53. Backing elements 54 comprise openings 55 for receiving holders 13 as shown in FIG. 5. Holders 13 can be easily manipulated or transported per se using teeth 15 of a fork which can engage on holders 13 under a shoulder 14 as shown in FIG. 6. In a specific embodiment the holders can comprise a second shoulder 56 with a larger diameter d, wherein this second shoulder 56 can come to rest on the periphery of openings 55 of floating carriers 6. It will be evident that connecting plates 53 also comprise passages 57 for passage of either a bottom 58 of holders 13 or roots 59 of the crop being cultivated in holders 13. In preference (only) the bottom of holders 13 is immersed in the water. In combination with passages 57 openings 55 define the growth locations 7 of floating carriers 6.

Figure 10:
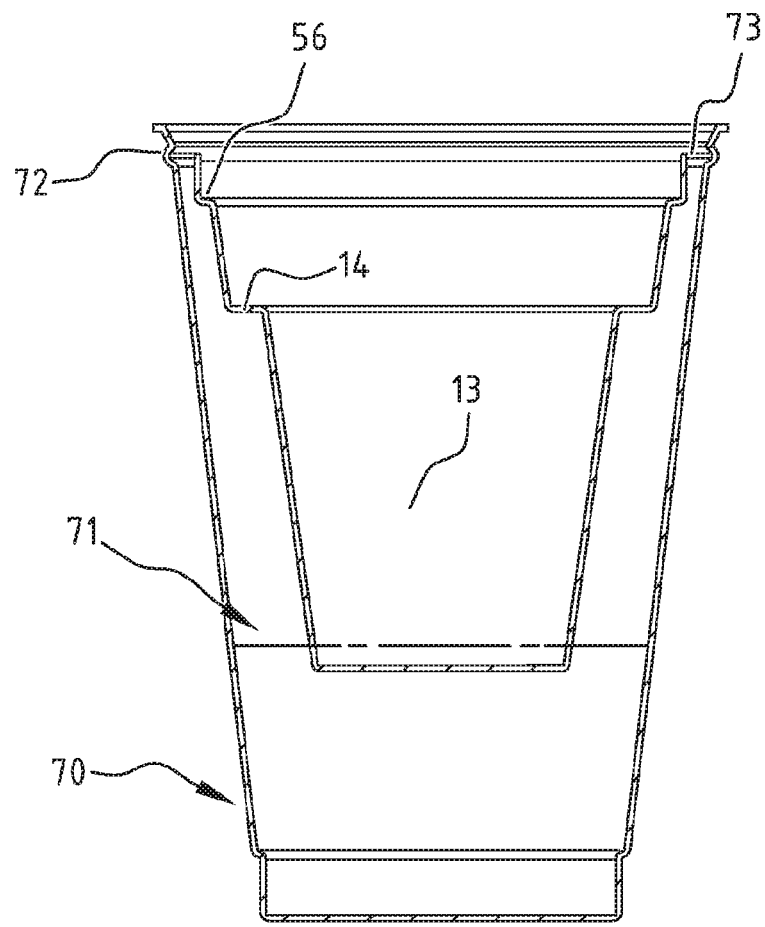
FIG. 10 depicts a crop holder placed in an outer pot.

During harvesting of the crops holders 13 can be placed in outer pots 70 as shown in FIG. 10. The outer pot comprises water up to a level 71 and holders 13 with the (almost) fully-grown crops therein can be snapped with a flanged edge 73 into a protrusion 72 of outer pot 70. Transport to a destination, such as a shop or wholesaler or auction, is therefore easily realized without the risk of the crops becoming short of water. The water supply up to level 71 will be maintained for the crops even if outer pots 70 in assembled state with holders 13 are shaken or come to lie on their side, since the water in outer pot 70 is enclosed by means of the snap connection. Flow of water out of the outer pot will in any case be obstructed as a result.

Floating carriers 6 can be extrusion profiles. The end surfaces thereof can be closed with covers or inserts, or plates can alternatively be welded or fused to the outer ends of beams 52 in order to realize a good watertight seal of beams 52.

Figure 12:
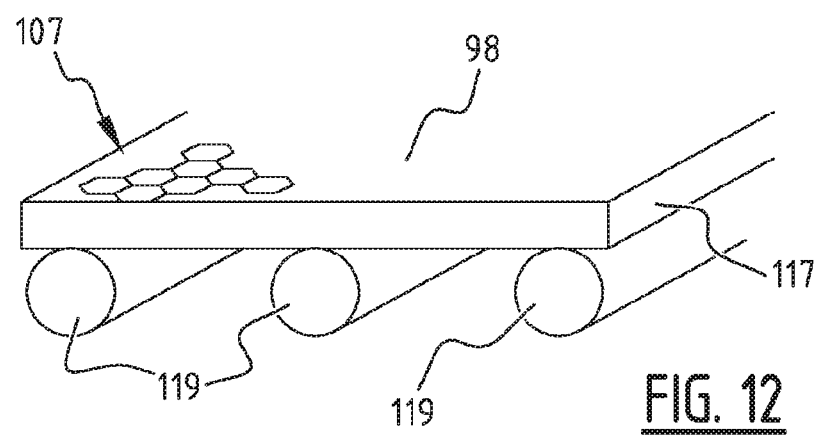
FIG. 12 shows yet another embodiment of a floating carrier according to the invention.
Figure 13:
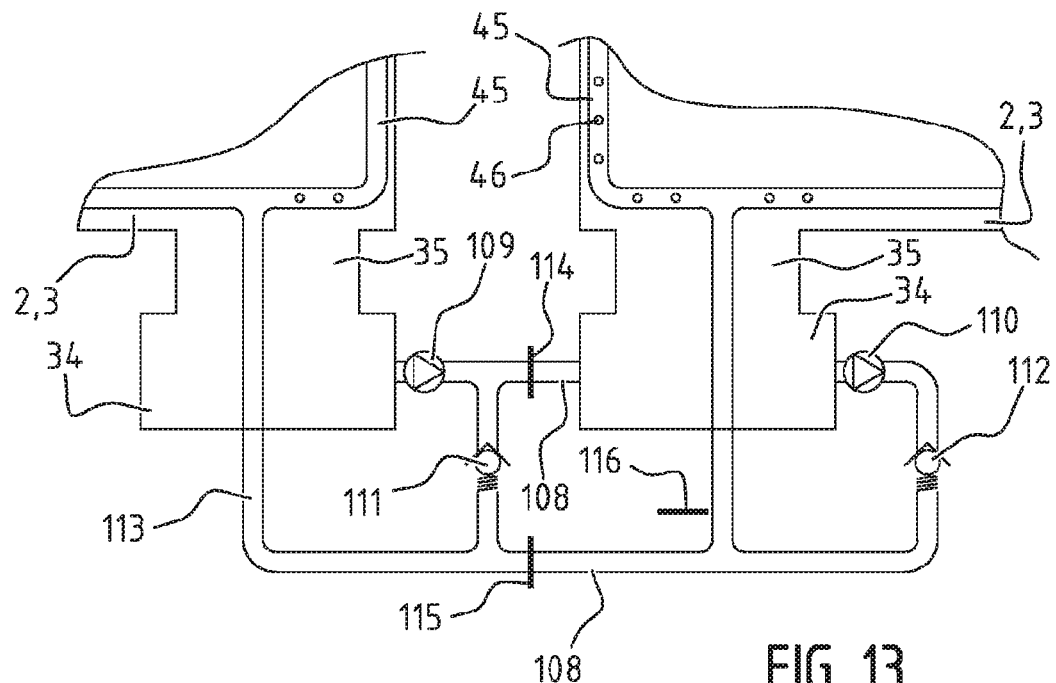
FIG. 13 shows a second mode of use of the embodiment of the floating carrier according to FIG. 12.

Also, in a further embodiment, as shown in FIGS. 12 and 14, a limited number of beams 119 or tubes may carry a frame 117 in which a honeycomb type plate 107 can be deposited, where the honeycomb plate defines channels for guiding root growth to a lower lying water level. On the honeycomb plate 107, a cloth or jute element 98 may be draped or deposited. Alternatively, as shown in FIG. 13, the frame 117 may accommodate on flanges 118 thereof (or in any other suitable manner) the previously described floating carriers 6 of FIG. 4, instead of the honeycomb plate 107. In the representation of FIG. 13, two floating carriers 6 are shown to be accommodated in frame 117, but the frame 117 is dimensioned to contain three such floating carriers 6. The honeycomb plate may be associated with baby leaf production, whereas the floating carriers in any of the disclosed embodiments may be associated with production of crops of lettuce.

The versatile frame 117, in which a honeycomb plate 107 or at least one floating carrier 4 may be accommodated, allows for the same or at least a similar manner of processing, regardless of the type of produce (babyleaf or crops of lettuce), for which appropriate inserts (honeycomb plate or floating carriers) can be employed, whilst lifts and the like can remain uniform without regard for the type of produce, as these would act on the frame 117 with beams 119, which beams 119 may be hollow to enhance buoyancy of the resulting different types of assemblies.

FIG. 7 shows how two floating carriers 6 can be placed mutually abutting with their respective end surfaces 60, 61, for instance for processing at stations 17, 18, 19 in FIG. 1. Adjacent growth locations are arranged along at least one beam 52 of one floating carrier 6 at the same intermediate distance a. The growth locations 7 positioned at opposite ends of floating carrier 6 are each arranged a shorter distance k, l than the intermediate distance a from the relevant end 60, 61 of floating carrier 6. The distances k+l from growth locations 7 at opposite ends 60, 61 of floating carrier 6 to the relevant ends 60, 61 of floating carrier 6 are equal to the intermediate distance a. In the example shown in FIG. 7 this distance k, l is made equal to a/2.

FIGS. 8 and 9 show an alternative embodiment of two similar floating carriers 62, each with three beams 63, 64 closed all the way around. FIG. 8 shows a cross-sectional view with adjacent floating carriers 62. Clearly shown here is that rows of growth locations 7 between adjacent beams 63, 64 are located at mutual intermediate distances b. Shown in FIG. 9 is a head-to-tail orientation of adjacent floating carriers 62 which is for instance highly suitable for mechanical processing. The same property is shown to apply here as that described with reference to FIG. 7 for intermediate distances a" between growth locations 7 in each row. It is additionally noted that each floating carrier 62 has two rows of growth locations 7 and that the same properties as those described with reference to FIG. 7 also apply for the intermediate distances between growth locations 7 in adjacent rows, this being indicated with intermediate distances a'. Connecting lines 65 between adjacent growth locations 7 in adjacent rows enclose in each case an angle α. The width of the central beams 64 is larger, in the embodiment shown in FIG. 8 twice as large, as the width of the outer beams 63. For the parameters of the width of the beams, the angles enclosed between connecting lines 65, the distance b between rows of growth locations 7 and so on, other ratios can also be envisaged in order to provide constant mutual distances between the rows, growth locations 7 in each of the rows and constant mutual distances between growth locations 7 in adjacent rows, even over end surfaces of floating carriers 6 in head-to-tail arrangement. In the embodiments shown here distances between growth locations 7 at an end surface of floating carriers 6 and a related end surface have been mentioned of a/2, as also referred to in FIGS. 7, 8 and 9, but it will be apparent that many other additional or alternative configurations are likewise possible in order to realize the desired continuous mutual intermediate distances between growth locations 7, even over separations between floating carriers 6 lying parallel adjacently of each other and over floating carriers 6 positioned head-to-tail.

After examination of the foregoing description of specific examples of embodiments within the scope of the present invention many additional and alternative embodiments will occur to the skilled person, which are not specifically disclosed here. The scope of protection for the present invention is in no way limited to the specific examples in the foregoing description and the accompanying drawings and is only limited by the specific or similar features as defined in the appended claims and shown and disclosed herein above. In particular, any one or more than one of: the suction or vacuuming system; the watering system and the UV illuminating system; the water supplying system; and the air and more preferably oxygen supplying system; the carrier lifting and lowering devices, and the like, may be implemented in a different embodiment of a hydroponics based cultivation system even without the circulatory transport system for promoting the floating carriers around the pond or basin. Likewise, shapes and forms of floating carriers may differ from the explicitly shown embodiments, and can be implemented even in environments separate from the circulatory transport system for promoting the floating carriers around the pond or basin.

The invention claimed is:

1. A floatable carrier for growing crops while floating on water in an elongate production pond with an infeed end and an opposite outfeed end, wherein the floatable carrier is elongate, and is configured to be moved in a longitudinal direction of the elongate production pond through the production pond from the infeed end to the outfeed end at a rate corresponding to bringing the crops to full growth, which floatable carrier comprises a floatable beam and a carrier connectable to the floatable beam and comprising a number of growth locations for the crops where holders for the crops or roots of the crops extend into the water, wherein adjacent growth locations are arranged along the floatable beam at equal mutual intermediate distances, and growth locations at mutually opposite ends of the floatable carrier are each arranged at a distance from the associated end of the floatable carrier which is smaller than the intermediate distance, and wherein a sum of the distances from the growth locations at mutually opposite ends of the floatable carrier to the associated ends of the floatable carrier equals the intermediate distance.

2. A floatable carrier as claimed in claim 1, wherein the floatable beam is hollow or manufactured from buoyant material, and extends as a strengthening beam over substantially the whole length of the elongate floatable carrier.

3. A floatable carrier as claimed in claim 1, wherein the growth locations are arranged to one side of the beam.

4. A floatable carrier as claimed in claim 1, comprising at least one additional floatable beam, arranged adjacent and parallel to the floatable beam, wherein the growth locations are arranged between the floatable beam and the at least one additional floatable beam.

5. A floatable carrier as claimed in claim 4, wherein two connecting elements are arranged between and connected to both floatable beams, extending therebetween to define the carrier and the growth locations thereof.

6. A floatable carrier as claimed in claim 1, with at least two rows of growth locations, which rows extend in the longitudinal direction of the floatable carriers, wherein the intermediate distance is a distance in the longitudinal direction between adjacent growth locations in adjacent rows.

7. A system comprising the carrier according to claim 1, wherein the system comprises a cloth, wherein the cloth is at least in use of the floatable carrier deposited or draped over the floatable carrier, and wherein the cloth is configured for seeds to be planted on or in the cloth before the floatable carrier is lowered into the pond or basin.

8. A floatable carrier as claimed in claim 1, wherein the carrier comprises openings configured to receive plant pot holders.

9. A floatable carrier as claimed in claim 1, wherein the carrier comprises a frame.

10. A floatable carrier as claimed in claim 9, wherein the frame comprises upturned flanges.

* * * * *